J. A. THOMAS.
SPRING WHEEL.
APPLICATION FILED MAR. 25, 1919.
1,315,055.
Patented Sept. 2, 1919.
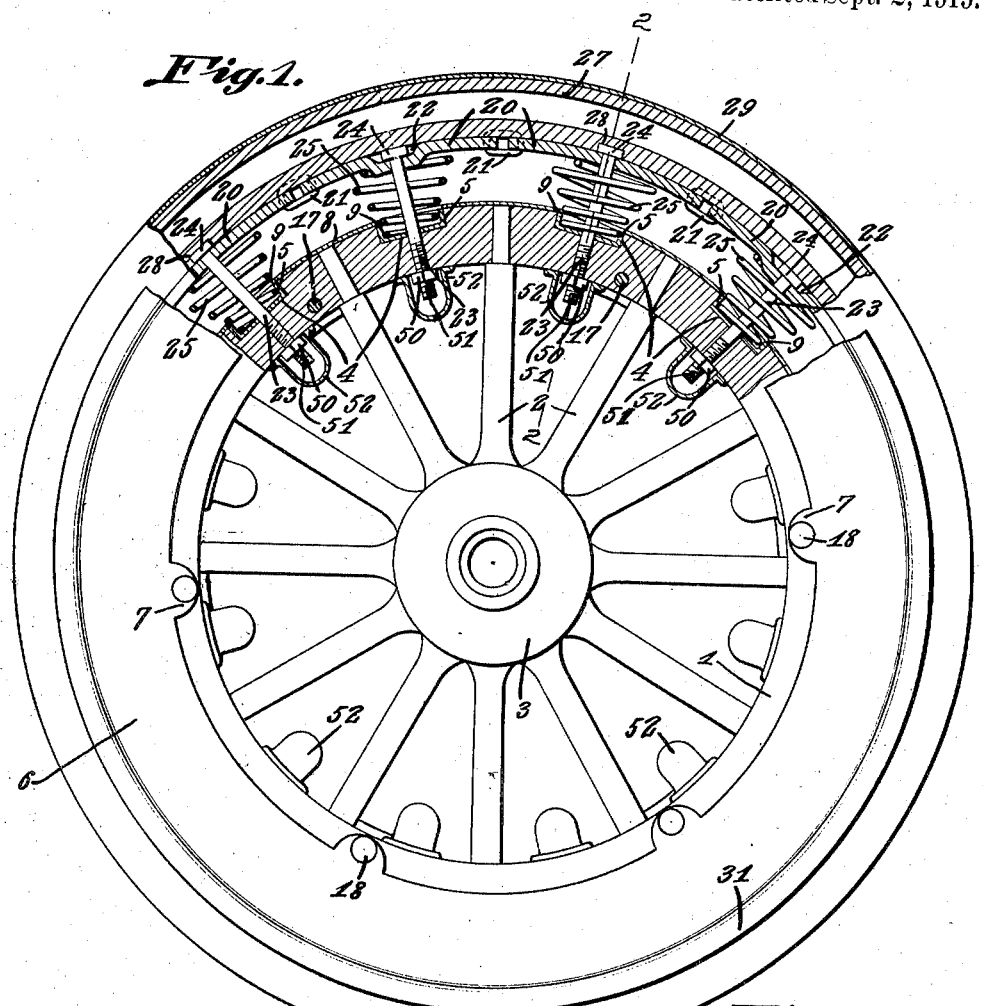
J. A. Thomas, Inventor

UNITED STATES PATENT OFFICE.

JAMES ALFORED THOMAS, OF LONGVIEW, TEXAS.

SPRING-WHEEL.

1,315,055.   Specification of Letters Patent.   Patented Sept. 2, 1919.

Application filed March 25, 1919. Serial No. 284,921.

*To all whom it may concern:*

Be it known that I, JAMES ALFORED THOMAS, a citizen of the United States, residing at Longview, in the county of Gregg and State of Texas, have invented a new and useful Spring-Wheel, of which the following is a specification.

The device forming the subject matter of this application is a spring wheel, and one object of the invention is to provide novel means whereby the tread may be supported yieldingly.

Another object of the invention is to provide novel means whereby the side plates are assembled with the felly.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a wheel constructed in accordance with the invention, parts being broken away, and parts appearing in section; Fig. 2 is a section on the line 2—2 of Fig. 1; Fig. 3 is a fragmental side elevation; Fig. 4 is a section on the line 4—4 of Fig. 3; and Fig. 5 is a fragmental plan showing a portion of the flexible tread band.

In carrying out the invention there is provided a felly 1 connected by spokes 2 with a hub 3. In its outer curve, the felly 1 is supplied with recesses 4 receiving cup-shaped retainers 5, which may be made of metal. A side plate 6 abuts against one edge of the felly 1 and is supplied with lugs 7, the side plate 6 having a laterally projecting felly band 8 surrounding and engaging the felly 1. The felly band 8 has openings 9 alined with the recesses 4 and with the cup-shaped retainers 5. The invention comprises a side plate 10 abutting against one edge of the felly 1. Angular clips 11 are provided, each clip comprising an arm 12 extended inwardly and coöperating with the inner curve of the felly 1, the clips comprising radial arms 14 coöperating with that edge of the felly 1 wherewith the side plate 10 engages, the arms 14 being cut away as shown at 15 to receive the inner edge of the side plate 10 and to form a shoulder which aids in supporting the said side plate. The arms 14 of the clips are provided with slots 16 which are elongated radially of the wheel. Securing devices, such as bolts 17, pass through the felly 1 and through the lugs 7 on the side plate 6, the bolts including heads 18 which, coacting with the lugs 7, serve to hold the side plate 6 in place on the felly 1. The bolts 17 pass through the elongated slots 16 in the arms 14 of the clips 11, the bolts carrying nuts 19 which engage the arms 14. It will be obvious that, owing to the construction above described, the side plates 10 and 6 will be held on the felly 1.

The invention comprises a flexible tread band made up of circumferentially extended plates 20, which may be fashioned from metal, the plates being connected at their ends by links 21. The flexible tread band above described is slidably received between the side plates 6 and 10 and is adapted to move toward and away from the felly 1. Certain of the plates 20 of the tread band are supplied in their outer surfaces with recesses 22. Spindles, which may be bolts 23 are mounted in the felly 1 and pass through the bases of the retainers 5 and through the plates 20 of the flexible tread band. At their outer ends, the bolts 23 are supplied with heads 24. In the inner ends of the bolts, nuts 50 are mounted, the nuts coöperating with the inner curve of the felly 1. Cotter pins 51 are inserted through the inner ends of the bolts 23 to prevent the nuts 50 from becoming detached. The inner ends of the bolts 23 are housed within thimbles 52 secured removably, in any desired way, to the inner curve of the felly 1.

The bolts 23 are surrounded by helical springs 25 which, preferably, are of tapered form, the inner convolutions of the springs 25 being seated in the cup-shaped retainers 5, and the outer convolutions of the springs engaging the plates 20 of the flexible tread band. Since the springs 25 are of outwardly tapered form, stability will be combined with resiliency. At their outer ends, the springs 25 are equipped with fingers 26 seated in the plates 20.

The invention comprises a tread 27, which, preferably is made of rubber and has some resiliency, the tread 27 being of approximately semi-circular shape in cross section and including a plane surface coöperating with the plates 20. The tread 27 has recesses 28 wherein the heads 24 of some of the bolts 23 are received, the heads 24 of the other bolts being received in the recesses 22 which are fashioned in certain of the plates 20 of the tread band. The construction is such that the tread 27 is interengaged with the bolts 23, and consequently with the plates 20 to prevent relative circumferential creeping between these parts, and, since certain of the heads 24 of the bolts are received in the recesses 22 of the plates 20 of the tread strip, a stable connection between the plates 20 and the bolts 23 is afforded.

The tread 27 may be inclosed within a flexible cover 29 bearing clencher beads 30 engaged with clencher flanges 31 on the outer edges of the side plates 10 and 6. The cover 29 is not absolutely essential, and if found to be objectionable or undesirable, it may be dispensed with. It will be clear that when pressure is applied to the tread 27, the same will move inwardly, along with the tread band, comprising the plates 20, the springs 25 being compressed, the tread 27 and the plates 20 sliding between the members 6 and 10 in a manner clearly understood by those skilled in the art.

When it is desired to move the tread 27 or to make other repairs, the nuts 19 on the bolts 17 are loosened. Then the clips 11 may be slid inwardly, toward the hub 3, until the outer ends of the arms 14 no longer overlap the inner edges of the plate 10. Then, the plate may be moved laterally. It is to be observed that during this operation, it is unnecessary to remove the nuts 19 from the bolts 17, and subsequently, the side plate 6 and the felly band 8 remain in place on the felly 1 of the wheel.

When the wheel is in operation, the bolts 23 may slide inwardly and outwardly, responsive to the action of the springs 25. The ends of the plates 20 of the tread band are loosely connected by the links 21 and the ends of the plates 20 are spaced sufficiently from each other to permit the radial movements of the bolts 23, as aforesaid.

It is to be observed that the retainers 5 exercise a double function, in that they constitute means for receiving the inner ends of the springs 25, and constitute, also, wear plates or washers wherein the bolts 23 are adapted to slide.

Having thus described the invention, what is claimed is—

1. A spring wheel comprising a felly, a flexible tread band having recesses in its outer surface; a tread coacting with the tread band and having recesses in its inner surface; spindles slidable in the felly and passing through the tread band, the spindles having heads, certain of the heads being received in the recesses of the tread band, and others of the heads being received in the recesses of the tread; and compression springs surrounding the spindles and interposed between the felly and the tread band.

2. A wheel comprising a felly; a first side plate coacting with one edge of the felly; a second side plate coacting with the other edge of the felly; L-shaped clips each including an arm bearing against the felly and overlapping the last specified side plate, and an arm coacting with the inner curve of the felly, the first specified arms having openings which are elongated radially of the felly; bolts passing through the first specified side plate, through the felly and through the first specified arms of the clips and located in the openings of said arms; nuts on the bolts; a tread slidable between the side plates; and means for supporting the tread yieldably.

In testimony that I claim the foregoing as my own, I have hereto affixed my signature in the presence of two witnesses.

JAMES ALFORED THOMAS.

Witnesses:
W. C. SHOULTS,
MARGARET HILL.

Copies of this patent may be obtained for five cents each, by addressing the "Commissioner of Patents, Washington, D. C."